United States Patent [19]
Baugnies et al.

[11] 3,770,098
[45] Nov. 6, 1973

[54] APPARATUS FOR REMOVING BODIES FROM A MOLDING MACHINE AND TRANSPORTING THE BODIES

[75] Inventors: Francis Baugnies, Braine-Le-Compte; Jean Bruyere, La Hulpe; Edmond Michel, Brussels, all of Belgium

[73] Assignee: Solvay & Cie, Brussels, Belgium

[22] Filed: Sept. 17, 1971

[21] Appl. No.: 181,520

[30] Foreign Application Priority Data
Sept. 25, 1970  France .............................. 7034946

[52] U.S. Cl. ............................... 198/25, 214/1 BD
[51] Int. Cl. ............................................ B65g 47/00
[58] Field of Search ............ 214/1 BC, 1 BD, 1 BS, 214/1 Q; 198/210, 20, 22, 25

[56] References Cited
UNITED STATES PATENTS

| | | | |
|---|---|---|---|
| 1,458,456 | 6/1923 | Young | 214/1 BC |
| 2,823,809 | 2/1958 | May | 214/1 BS |
| 2,570,660 | 10/1951 | Gamble | 214/1 BD |
| 2,643,778 | 6/1953 | Socke | 198/210 |
| 1,921,389 | 8/1933 | Ingle | 214/1 BC |
| 3,608,744 | 9/1971 | Ward | 214/1 BC |

*Primary Examiner*—Richard E. Aegerter
*Attorney*—George H. Spencer et al.

[57] ABSTRACT

Apparatus for removing hollow plastic bodies from a blow molding machine, in which an ejector mechanism is provided to eject the finished bodies, and then placing the bodies on a conveyor. A series of gripping elements are arranged on a movable support for movement along a transport path going past a withdrawal point where each gripping element is in a proper position to remove a body from the machine and thence past a release point where each gripping element is in a proper position to deposit the body on the conveyor. Control means are provided to cause each gripping element, as it moves past the withdrawal point, to grip a body when it is ejected from the machine and extract it from the machine and, as each gripping element moves past the release point to release the body and place it on the conveyor.

13 Claims, 2 Drawing Figures

APPARATUS FOR REMOVING BODIES FROM A MOLDING MACHINE AND TRANSPORTING THE BODIES

BACKGROUND OF THE INVENTION

The present invention relates to an apparatus for removing hollow bodies of plastic material from molds after they have been produced by the blow mold method.

A wide range of machines is available on the market for molding hollow bodies of plastic materials, in which the desired articles are formed by blow molding in a suitable mold. The majority of these machines permit the production of finished or semi-finished hollow bodies, which, after being removed from the molds, are discharged into a hopper or other receiver. The hollow bodies received in this manner must then be deposited manually on a conveyor, which carries them either to a finishing station or to a packing or wrapping station. This involves a manual operation which is time consuming and expensive.

SUMMARY OF THE INVENTION

It is therefore an object of the invention to provide an apparatus which is capable of automatically removing bodies, such as hollow bodies of plastic material, from molds which approach the apparatus in succession and then handling the individual bodies for transport, in the correct position, to the next work station.

It is also an object of the invention to provide apparatus of the above-mentioned type which can be used with various types of molding machines.

It is a still further object of the invention to provide apparatus in which the body being transported follows a predetermined path of movement so that the body can be inspected during the movement.

The apparatus according to the present invention is composed of a series of gripping elements suitably mounted on a movable support. Each gripping element is so constructed as to grip a molded hollow body by its neck in cooperation with the mold ejector at the moment when the latter ejects the hollow body from the mold. After extracting the hollow body from its mold, the gripping element is moved by the support to another position to deposit the body on a suitable conveyor.

The movable support is so constructed as to bring each successive gripping element opposite the neck of each successive molded hollow body at the moment when the latter is ejected from its mold and to dispose the hollow body in the correct position on the conveyor. When the body is correctly positioned on the conveyor, the gripping element is retracted from the body to the position where it is ready to receive another body from a mold.

The gripping element can be a suction cup or any other device capable of gripping and holding a hollow body by its neck. It is possible, for example, to use a gripping element, made of an elastically deformable material, and having a fixed opening which is slightly smaller than the outside diameter of the neck of the hollow bodies to be gripped. In this case the hollow body is held through the elastic engagement of its neck in the opening in the gripper, after the neck is driven into this opening by the action of the mold ejector.

It is also possible to use a gripping element composed of two movable jaws adapted to close on the neck of the hollow body at the moment when the latter is ejected from its mold and to open at the moment when the same hollow body is deposited on the conveyor.

The movable support may be a rotating plate and the means for mounting the gripping elements on the support includes a plurality of peripherally disposed articulated arms at the ends of which the gripping elements are fixed. This plate is so disposed and constructed that each articulated arm presents a gripping element opposite the neck of each successive molded hollow body at the moment when the mold is opened and the ejector starts to expel the body.

In addition, each articulated arm is equipped with devices, such as mechanical, pneumatic, hydraulic, or electric controls which enable the gripping element to grip the neck of the hollow body in cooperation with the ejector and to extract the hollow body from its mold.

The rotating plate and its articulated arms are also provided with, devices of the same type as those mentioned above, which insure that each hollow body held in a gripping element is moved to a conveyor along a predetermined path and is freed when it is corectly positioned on the conveyor.

In order to eliminate, as far as possible, any risk of dropping the hollow bodies at the moment when they are freed on the conveyor, it is preferable that the latter should have a linear speed equal to that of the gripping elements at the moment when they are retracted from the hollow bodies.

This type of apparatus is particularly advantageous when used with a molding machine of the continuous rotary type. This type of machine has a series of contiguous half-molds, disposed on the arms of a rotary support, and each half-mold is associated with a second, complementary half-mold which is applied against the first half-mold after the continuously delivered parison has been deposited. This forms a complete mold equipped with means, such as a hollow needle, that permits the introduction of an expansion fluid into the portion of parison which is enclosed therein. In addition the machine is equipped with means, such as deflashing tools, which eliminate the portion of parison existing between the successive molds and, during the molding, deflash the bottoms of the molded hollow bodies.

When the apparatus, according to the invention, is used with this type of machine, it is convenient to make the rotational speed of the movable support dependent on the rotational speed of the molding machine.

If desired, however, the movable support may be a chain which moves at a constant speed along a path defined by a fixed support. In this case the path of movement of the chain must be such that each gripping element with which it is equipped is presented in sucession opposite the neck of each successive hollow body at the moment when the latter is ejected from its mold.

This alternative construction is found particularly advantageous when it is utilized with a molding machine of the rotary type described above but equipped with double cavity molds, each of which producing two hollow bodies joined by their necks. In this case, after the resulting products have been removed from the mold, it is advantageous to present them in a recumbent position at the inlet of a deflashing device which separates the two hollow bodies by eliminating the central portion joining them.

The chain may then advantageously be equipped with gripping elements, each of which is constituted by grippers having fixed jaws made of an elastically deformable material, between which the central portion of each pair of hollow bodies is inserted through the thrust applied by the ejector. These hollow bodies driven by the chain are then freed over a suitable hopper with the aid of a fixed stop or any other equivalent means which extracts them from their gripper.

While the apparatus which will be described in detail is specially designed for use with a rotary blow molding extrusion machine of the type described above, this does not in any way exclude the possibility of the apparatus according to the invention being used, if necessary after certain modifications, with other types of hollow body molding machines.

DESCRIPTION OF THE PREFERRED EMBODIMENTS

Figure 1:
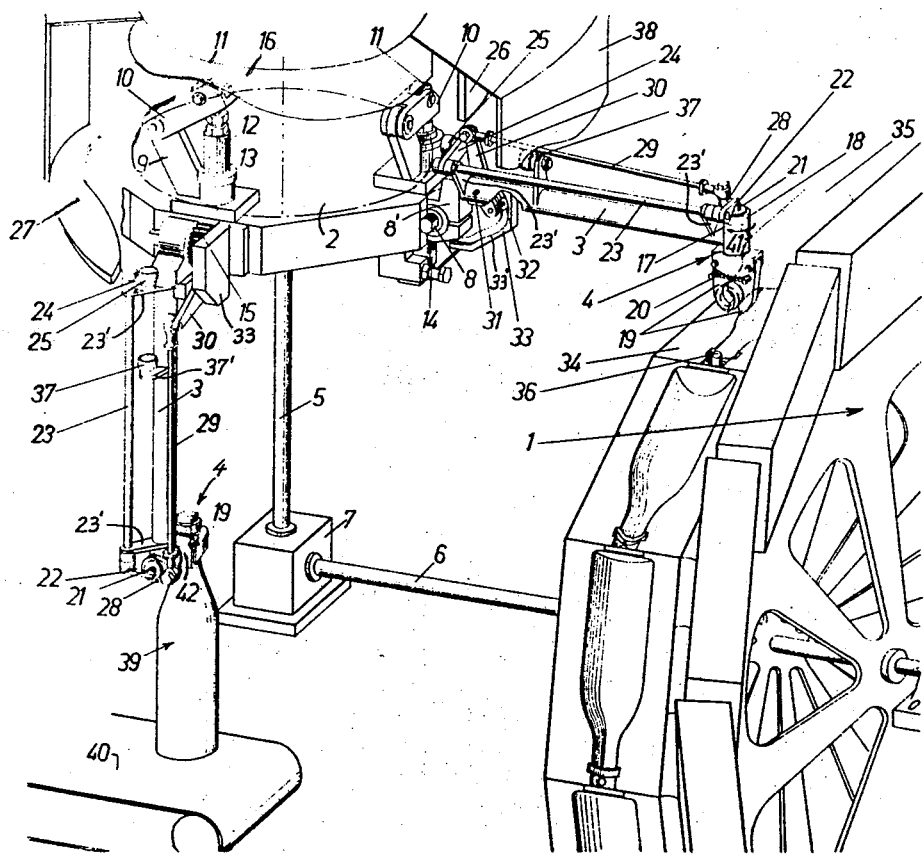
FIG. 1 is a view in perspective of an apparatus according to the invention.

As seen in FIG. 1 the apparatus according to the invention is associated with a molding machine of the rotary type, generally indicated at 1, which will not be described in detail as the construction and operation of this type of machine is known in the art. The apparatus includes a rotatable plate 2 which carries on its periphery a plurality of articulated arms 3 with gripping elements, generally indicated at 4, on the ends thereof. Only two arms 3 are shown but this will permit a sufficient disclosure of the operation of the apparatus.

The rotatable plate 2 is driven synchronously with the rotary molding machine 1 by shafts 5 and 6 and a suitable transmission 7, not shown in detail.

The number of articulated arms 3 is determined from the diameter of the circle described by the gripping elements 4, taking into account the fact that the distance between two consecutive grippers should preferably be slightly greater than the greatest height of hollow bodies which can be cast in the rotary machine.

Each articulated arm 3 is pivotally mounted on rotatable plate 2 by means of a shaft 8, and an associated bracket 8'. These pivotally mounted arms are each equipped with control devices which permit their position to be varied between two limit positions and control the gripping elements. In the first limit position the arms are perpendicular to the axis of rotation of the rotating plate 2, and in the other limit position they are parallel to the same axis. The control devices, to be described later, involve the use of mechanical linkage systems under the control of associated cams.

One of the control devices includes a support arm 9, mounted on the top surface of rotatable plate 2, which pivotally carries lever arm 10 having a roller 11. This roller rests on the top of a control rod 12 which extends down through plate 2 but is biased upward by means of compression spring 13. At the lower end of control rod 12 there is a rack portion 14 which meshes with a toothed pinion 15 fixed to bracket 8' of arm 3.

In the normal position the compression spring 13 and the dead weight of the articulated arm 3 tend to hold the latter in position parallel to the axis of rotation of the rotating plate 2.

The movements of the articulated arms 3 between their limit positions in the course of the operation of the apparatus are dictated by a fixed cam 16 of suitable profile, which acts on the control roller 11, in a manner to be described later.

Figure 2:
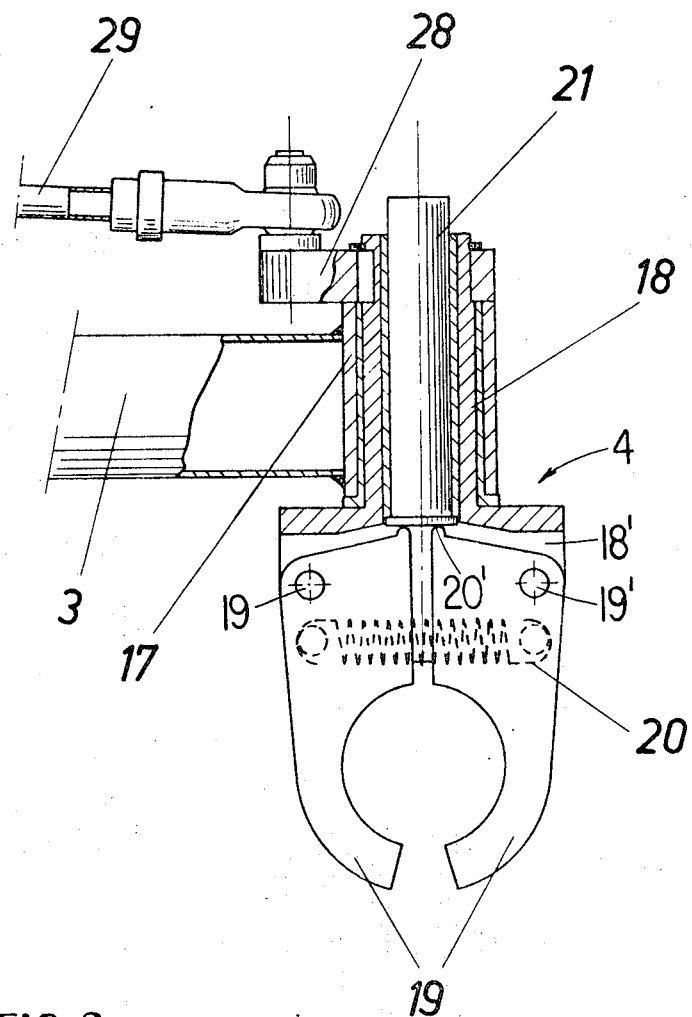
FIG. 2 is a view in section of a gripping element with which the apparatus shown in FIG. 1 is equipped.

Attention is now directed to FIG. 2 where it can be seen that the gripping element 4 on each arm 3 includes a bushing 17 which is fixed to the end of arm 3. Supported within this bushing is a second bushing 18 which has a dependent plate portion 18' on which a pair of movable jaw members 19 are pivotally mounted as at 19'. These jaws are held in the normally closed position by spring means 20 but can be moved apart against the action of the spring when a pushrod 21 is moved downward in bushing 18 and engages shoulders 20' on the jaw members 19.

The means for moving pushrod 21 is shown in FIG. 1 and includes a lever arm 22 which is secured to one end of rod 23 and which bears against the top surface of pushrod 21. Rod 23 is rotatably mounted in brackets 23' carried by arm 3 and has at its other end a lever arm 24 which carries the control roller 25. This control roller coacts with the surfaces of cam members 26 and 27 in a manner to be explained later.

Another of the control devices includes means for rotating the bushing 18 within bushing 17 and consequently rotating the movable jaws 19. As shown in FIGS. 1 and 2 a lever arm 28 mounted on bushing 18 is connected to a control rod 29 having at its other end a lever 30 articulated on a pivot pin 31 fixed to the arm 3. This lever 30 has a control roller 32 designed to coact with a cam member 33, having a cam surface 33' which is fixed to plate 2.

The profile of this cam surface 33' in fixed cam member 33 is so designed that the movement of the articulated arm 3 corresponding to its displacement between its two limit positions, in relation to the axis of rotation of the rotating plate 2, effects the rotation by a quarter-turn of the bush 18 and consequently of the gripping element 4 in the fixed bush 17.

The operation of the apparatus which has just been described is as follows:

At the moment when any mold 34 of the rotary molding machine 1 opens after the blow molding and sufficient cooling of equipped molded hollow body 35, an articulated arm 3 held in a position perpendicular to the axis of rotation of the rotatable plate 2, by means of the cam 16 bearing against the control roller 11, takes up a position above the neck of the molded hollow body 35, a manner that its gripping element 4, in the closed position, is situated practically facing the ejector 36 of the mold 34.

At this moment the cam member 26 pushes the control roller 25 downwards and this motion is translated through lever arm 24 and rod 23, to the lever 22 which bears down against the pushrod 21. This causes the jaws 19 of the gripping element 4 to open against the action of the spring 20.

As soon as the ejector 36 starts to expel the molded hollow body 35 from the mold 34 the profile of the cam is such that it imparts a slight downward movement to the articulated arm 3 through roller 11, control rod 12, rack portion 4 and pinion 15 on arm 3. This causes the gripping element 4 to bear against the neck of the hollow body being removed from the mold, while the jaws 19, which are held in the open position by the cam 26, surround the neck. The ejector 36 thus pushes the neck of the hollow body 35 between the jaws 19 of the gripping element 4.

During this phase of the operation any undesirable displacement of the articulated arm 3 in the upward direction can be avoided with the aid of a retaining roller 37, fastened to the articulated arm 3 by bracket 37', which bears against a fixed cam 38 of suitable profile.

As soon as the jaws 19 completely surround the neck of the hollow body 35, at the moment when the ejector 36 has reached the end of its stroke, the control roller 25 is abruptly released from the cam member 26 and, since the jaws 19 are no longer controlled by the pushrod 21, they close over the neck of the hollow body 35 through the action of the spring 20.

At this moment the profile of the cam member 16 imparts a slightly upward movement to the articulated arm 3, so as to return it to its original position perpendicular to the axis of rotation of the rotatable plate 2. This movement enables the hollow body 35 to be completely removed from the mold 34, and the hollow body is then held solely by the jaws 19 of the gripping element 4.

The removal of the hollow body 35 from the mold, particularly when the latter has a back-taper, presents no difficulty. Since the distance separating two consecutive gripping elements is slightly greater than the height of the molds, the speed of advance of the gripping elements is in fact slightly higher than the speed of movement of the molds. This has the effect that the hollow body 35 is extracted from its mold by performing a slight movement towards the head of the mold, thus permitting good disengagement of its bottom.

As the rotation of the rotatable plate 2 continues, the cam member 16 is progressively retracted from the control roller 11 and, under the effect of the dead weight of arm 3 and the action of the spring 13 which moves the rack 14 in the upward direction, the articulated arm 3 takes up a position which is parallel to the axis of rotation of the rotatable plate 2.

During this movement the roller 32 slides in cam surface 33' on the cam 33 to cause the bushing 18 to rotate a quarter of a turn in the direction of the arrow 41, within the bushing 17. This is accomplished through the movement of the lever 30, the control rod 29, and the lever arm 28. In this way the hollow body 35 is brought progressively, and always along the same path, into the position, generally indicated at 39, in which it is deposited on a bucket or belt conveyor 40.

This conveyor 40 performs a linear movement which is identical to that of the hollow body 35 at the moment when the articulated arm 3 brings the body into contact with the conveyor. This synchronism of relative speeds can be achieved through known means or devices, such as a simple mechanical connection between the conveyor drive and the transmission 7 (not shown), or a variable speed motor driving the conveyor.

At this moment the cam member 27 coacts with the roller 25 in such a manner as to open the jaws 19 of the gripping element 4 through the movement of the lever arm 24, the rod 23, the lever arm 22, and the pushrod 21.

At the same time, the profile surface of the cam member 16 is acting again on the control roller 11 and progressively pushes the control rod 12 downwards against the action of the spring 13. Consequently, the rack 14 descends and the toothed pinion 15, on arm 3, progressively returns the articulated arm 3 to its position perpendicular to the axis of rotation of the rotatable plate 2, thus completely freeing the hollow body 35 deposited on the conveyor 40.

Synchronization between the speeds of displacement of the conveyor 40 and of the articulated arms 3 at the moment when the hollow body is deposited on the conveyor makes it possible for the relative speed between the conveyor 40 and the hollow body 35 to be cancelled, and thus reduces the risk that the hollow body will fall at the moment when it is released by the articulated arm 3.

While the articulated arm 3 is resuming its position perpendicular to the axis of rotation of the rotatable plate 2 the cam member 27 is retracted under the control roller 25 and the jaws 19 are closed under the action of their spring 20.

At the same time the control roller 32 slides in the other direction in the cam surface 33' on the cam 33 and the bushing 18 returns to its original position in the bushing 17, effecting a rotation of a quarter-turn in the direction indicated by the arrow 42.

Thus, when the articulated arm 3 is again presented above a mold in the molding machine 1, it has resumed its starting position and is ready to commence a new cycle of operation.

It will be understood that the above description of the present invention is susceptible to various modifications, changes and adaptations, and the same are intended to be comprehended within the meaning and range of equivalents of the appended claims.

We claim:

1. Apparatus for removing plastic bodies in combination with a blow molding machine having an ejector mechanism which ejects a finished body from molds in the machine and for placing such bodies on a conveyor, the apparatus comprising:

a. a movable support and a series of gripping elements arranged on said support for movement therewith along a transport path going past a withdrawal point where each respective gripping element is in a position to remove a plastic body from a mold in the molding machine and thence past a release point where each respective gripping element is in a position to deposit the plastic body on the conveyor; and b. means for causing each respective gripping element, as it moves past said withdrawal point, to initially grip a plastic body partially displaced from its mold by the ejector mechanism and to then extract it from the molding machine and, as each respective gripping element moves past said release point, to release such body and to place it on the conveyor.

2. Apparatus as defined in claim 1, wherein each of said gripping elements includes a suction cup to grip the body.

3. Apparatus as defined in claim 1, wherein each of said gripping elements includes jaw members to grip the body.

4. Apparatus as defined in claim 1, wherein each of said gripping elements includes elastically deformable means having an opening of a width slightly smaller than the portion of the body which is gripped.

5. Apparatus as defined in claim 1, wherein said movable support is a rotatable plate.

6. Apparatus as defined in claim 5, wherein synchronizing means are disposed between said movable support and the machine so that the speed of rotation of said plate is dependent on the speed of rotation of the machine.

7. Apparatus as defined in claim 1, wherein a second synchronizing means is disposed between said movable support and the conveyor so that the conveyor moves with a linear speed equal to that of said gripping elements moving past the release point.

8. Apparatus for removing molded bodies in combination with a rotary blow molding machine, having an ejector mechanism which ejects a finished body, from a mold, and individually depositing the bodies on a conveyor, the apparatus comprising:
 a. a rotatable support means synchronized for movement with the associated machine and conveyor;
 b. a plurality of gripping elements movably mounted on said support means, said gripping elements in a first limit position being adjacent the machine and in a second limit position overlying the conveyor;
 c. cam means spatially fixed with respect to the axis of rotation of said support means;
 d. a plurality of control systems coacting with said cam means, said control systems providing means for (i) controlling the movement of said gripping elements along a fixed path between limit positions, (ii) controlling the action of said gripping elements in the first limit position to initially grip a body, partially displaced from a mold by the ejection mechanism, before removing the body from the mold and to release the body in the second limit position, and (iii) controlling said gripping elements to rotate the body approximately 90° during the time of movement of the body between a first and second limit position, whereby the body is removed from the machine and deposited in an upright position on the conveyor prior to release.

9. Apparatus for removing individual hollow bodies from a rotary blow molding machine in which the bodies are molded, and then subsequently transporting the individual bodies to an associated conveyor means for deposit and release thereon, each of the molded bodies having a neck portion which is engageable by an ejector on the machine to expel the body from the machine, comprising in combination:
 a. a rotatable support means associated with the machine and conveyor means;
 b. means disposed between said support means and the machine for synchronizing the rotation of said support means and the machine;
 c. a plurality of arm members peripherally and pivotally mounted in spaced relationship on said support means;
 d. gripping means mounted at the end of each of said arm members adjacent the machine, each of said gripping means including means for releasably gripping the neck portion of a body;
 e. a plurality of cam means disposed in fixed spatial relationship with respect to the axis of rotation of said support means;
 f. a first mechanical linkage system associated with a first cam means, said first system controlling the path of movement of each of said members between first and second limit positions, each of said arm members in a first limit position extending perpendicular to the axis of rotation of said support means toward said machine and each of said arm members in a second limit position extending parallel to the axis of rotation, and toward the conveyor means;
 g. a second mechanical linkage system associated with a second cam means, said second system controlling said gripping means to grip said body expelled from the machine when an arm member is in a first limit position and to release said body when said arm member is in a second limit position;
 h. a third mechanical linkage system associated with a third cam means, said third system controlling said gripping means to rotate said gripping means approximately 90° along the path of travel of said arm member from the first to second limit positions, whereby said body is removed from the machine and deposited in an upright position on the conveyor means.

10. Apparatus as defined in claim 9 wherein said gripping means include spring biased movable jaw members.

11. Apparatus as defined in claim 9 wherein said support means is a plate member.

12. Apparatus as defined in claim 9 wherein a second means is disposed between said support means and the conveyor means to syncrhonize the movement of said support and conveyor means so that the conveyor means moves with a linear speed equal to that of said gripping means when the body is deposited on the conveyor means.

13. A method of removing molded bodies from a rotary blow molding machine, having an ejection mechanism which can eject a finished body from a mold, and individually depositing the bodies on a conveyor, comprising the steps of:
 a. ejecting a body from its mold to a first position where the body is partially displaced from the mold and simultaneously gripping the body as disposed in this first position in the machine;
 b. moving the body away from the machine along a fixed path;
 c. rotating the body approximately 90° to a second position while simultaneously continuing the movement of the body along the fixed path;
 d. depositing the body, in its second position on the conveyor after the body has been moved to a limit position along the fixed path; and
 e. releasing the body in the second position on the conveyor.

* * * * *